(12) United States Patent
Endo

(10) Patent No.: US 7,521,911 B2
(45) Date of Patent: Apr. 21, 2009

(54) SWITCHING POWER SUPPLY CAPABLE OF ALWAYS SWITCHING A SWITCHING ELEMENT AT AN OPTIMAL TIMING

(75) Inventor: Naoto Endo, Tokyo (JP)

(73) Assignee: Mitsumi Electric Co., Ltd., Tama-shi (JP)

(*) Notice: Subject to any disclaimer, the term of this patent is extended or adjusted under 35 U.S.C. 154(b) by 418 days.

(21) Appl. No.: 11/413,557

(22) Filed: Apr. 28, 2006

(65) Prior Publication Data

US 2007/0018618 A1    Jan. 25, 2007

(30) Foreign Application Priority Data

Jul. 19, 2005    (JP) ............................. 2005-209217

(51) Int. Cl.
G05F 1/652    (2006.01)
G05F 3/16    (2006.01)

(52) U.S. Cl. .................. 323/282; 323/284; 323/285; 323/274; 323/222

(58) Field of Classification Search ................ 323/282, 323/284, 285, 274, 222
See application file for complete search history.

(56) References Cited

U.S. PATENT DOCUMENTS

| | | | |
|---|---|---|---|
| 4,720,667 A | | 1/1988 | Lee et al. |
| 5,521,809 A | * | 5/1996 | Ashley et al. .................. 363/71 |
| 5,636,106 A | | 6/1997 | Batarseh et al. |
| 5,663,635 A | | 9/1997 | Vinciarelli et al. |
| 5,712,772 A | | 1/1998 | Telefus et al. |
| 5,920,182 A | * | 7/1999 | Migliavacca ................ 323/282 |
| 6,038,154 A | | 3/2000 | Boylan et al. |
| 6,211,701 B1 | | 4/2001 | Kuijk et al. |
| 6,285,174 B1 | * | 9/2001 | Suzuki ....................... 323/288 |
| 6,700,801 B2 | | 3/2004 | Morita et al. |
| 6,710,582 B2 | | 3/2004 | Watanabe |
| 6,867,986 B2 | | 3/2005 | Amei |
| 7,002,323 B2 | | 2/2006 | Natori |
| 7,006,362 B2 | | 2/2006 | Mizoguchi et al. |
| 7,027,313 B2 | | 4/2006 | Amei |
| 7,049,774 B2 | * | 5/2006 | Chin et al. .................. 318/438 |

(Continued)

OTHER PUBLICATIONS

Related U.S. Appl. No. 11/413,726, filed Apr. 28, 2006; Inventor; Endo, Naoto.; and.

(Continued)

*Primary Examiner*—Bao Q Vu
(74) *Attorney, Agent, or Firm*—Frishauf, Holtz Goodman & Chick, P.C.

(57) ABSTRACT

A control circuit has a delay correction circuit for correcting a delay involved for driving a switching element. The delay correction circuit has a reference voltage generating circuit for generating a reference voltage, a first comparator for comparing the reference voltage with a driving control signal to produce a first comparison result signal, an error signal generating circuit for generating a lag direction signal or a lead direction signal on the basis of the first comparison result signal and a zero-current detected signal, a voltage level error signal generating circuit for generating a voltage level error signal in response to the lag direction signal or the lead direction signal, a timer for producing a timer signal having a predetermined sawtooth waveform, and a second comparator for comparing the voltage level error signal with the timer signal to produce a second comparison result signal as a delay correction signal.

14 Claims, 11 Drawing Sheets

U.S. PATENT DOCUMENTS

| | | |
|---|---|---|
| 7,224,149 B2 | 5/2007 | Endo |
| 2001/0011921 A1* | 8/2001 | Ooishi ........................ 327/540 |
| 2004/0239298 A1* | 12/2004 | Norrga et al. ............... 323/282 |
| 2004/0239299 A1* | 12/2004 | Vinciarelli .................. 323/282 |
| 2007/0018619 A1 | 1/2007 | Endo |
| 2007/0200540 A1 | 8/2007 | Hashimoto et al. |

OTHER PUBLICATIONS

Related U.S. Appl. No. 11/412,012, filed Apr. 26, 2006; Inventor: Endo, Naoto.

* cited by examiner

VIR

VZC

VGH1

VGH2

VCR

ZVS

VGL1

VGL2

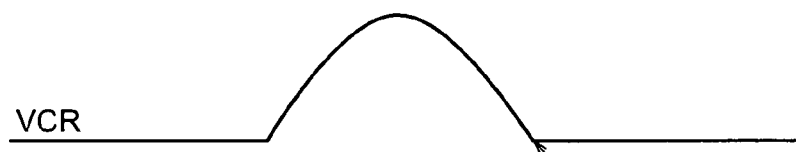
FIG. 11A  VCR
FIG. 11B  ZVS  CORRECTION (PREDICTION)
FIG. 11C  VGLL
FIG. 11D  VGL1
FIG. 11E  VGL2
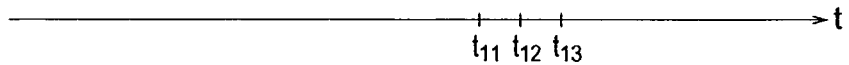
$t_{11}\ t_{12}\ t_{13}$

SWITCHING POWER SUPPLY CAPABLE OF ALWAYS SWITCHING A SWITCHING ELEMENT AT AN OPTIMAL TIMING

This application claims priority to prior application JP 2005-209217, the disclosure of which is incorporated herein by reference.

BACKGROUND OF THE INVENTION

This invention relates to a power converter and, in particular, to a switching power supply such as a current resonance type DC/DC converter including a resonance circuit and a controlling method thereof.

In the manner which is well known in the art, the DC/DC converter is a power converter for converting an input DC voltage (which will later be merely also called an "input voltage") into an output DC voltage (which will later be merely also called an "output voltage") which is different from the input DC voltage.

As one of the DC/DC converters, there is a PWM (pulse width modulation) type DC/DC converter is known in the art. The PWM type DC/DC converters have various types which are classified into a step-down type, a step-up type, a polarity reversing type, or the like. The step-down PWM type DC/DC converter comprises an energizing switch, a short-circuit switch, and an output inductor. In lieu of the short-circuit switch, a diode may be used.

However, the PWM type DC/DC converter is disadvantageous in that it has a large switching loss when the energizing switch changes from an on state to an off state or changes from an off state to an on state. As a DC/DC converter which is capable of eliminating such a switching loss, a current resonance type DC/DC converter is known, for example, in U.S. Pat. No. 5,663,635 issued by Vinciarelli et al.

Although the current resonance type DC/DC converter will later be described in conjunction with FIGS. 1 and 8, the current resonance type DC/DC converter comprises a current resonance type DC/DC converting portion which includes an energizing switch, a resonance circuit, a short-circuit switch, and an output inductor. The energizing switch is turned on and off in response to a first driving control signal. The resonance circuit consists of a resonance inductor and a resonance capacitor. The resonance inductor has an end connected to the energizing switch. The resonance capacitor has an end connected to another end of the resonance inductor. The resonance capacitor has another end which is grounded. The short-circuit switch is connected in parallel with the resonance capacitor. The short-circuit switch is turned on and off in response to a second driving control signal. The output inductor has an end connected to the other end of the resonance inductor. The output inductor has another end connected to an end of an output capacitor. Each of the energizing switch an the short-circuit switch acts as a switching element.

In the current resonance type DC/DC converter, a current flows through the resonance inductor only for a resonance duration with respect to a switching period. The current does not flow through the resonance inductor for a duration obtained by removing the resonance duration from the switching period. When an input/output voltage ratio becomes smaller, the switching period with respect to the resonance duration becomes longer. As a result, durations where the current does not flow through the resonance inductor increase, as described, for example, in U.S. Pat. No. 4,720,667 issued by Lee et al.

The current resonance type DC/DC converter has a large advantage where a zero-current switching of the energizing switch is enable by using a series resonance of the resonance circuit consisting of the resonance inductor and the resonance capacitor, and it results in eliminating the switching loss.

In other words, generally, in the current resonance type DC/DC converter, the energizing switch is turned off on the moment at which a sum of the resonance current in the circuit and a load current becomes zero. That is, the reduction in the switching loss of the energizing switch is accomplished by performing the zero-current switching (ZCS).

The current resonance type DC/DC converting portion comprises a current detection arrangement and a voltage detection arrangement. The current detection arrangement is for detecting a current flowing through the energizing switch to produce a current detected signal. The current detection arrangement may be a current detection resistor inserted between the energizing switch and the resonance inductor. The voltage detection arrangement is for detecting a both-ends voltage of the resonance capacitor to produce a voltage detected signal. The voltage detection arrangement may be a signal line having an end connected to a connection node between the resonance inductor and the resonance capacitor.

The current resonance type DC/DC converter comprises a control circuit for producing the first and the second driving control signals. In other words, the control circuit is for controlling turning-on/off of the energizing switch and the short-circuit switch. Specifically, the control circuit comprises a first control portion for controlling the turning-on/off of the energizing switch and a second control portion for controlling the turning-on/off of the short-circuit switch.

The first control portion comprises a zero-current detection circuit connected to both ends of the current detection resistor, a first control logic circuit, and a first driver. The zero-current detection circuit detects whether a both-ends voltage of the current detection resistor is zero or not to produce a zero-current detected signal when the both-ends voltage of the current detection resistor is zero. The both-ends voltage of the current detection resistor corresponds the current detected signal. That is, the zero-current detection circuit is for detecting a zero-current on the basis of the current detected signal to produce the zero-current detected signal indicative of the zero-current. Responsive to the zero-current detected signal, the first control logic circuit produces an original high-side gate signal indicative of making the energizing switch turn off. Responsive to the original high-side gate signal, the first driver supplies a driving high-side gate signal to a control terminal of the energizing switch through a first signal line. The driving high-side gate signal corresponds to the first driving control signal.

On the other hand, the second control portion comprises a zero-voltage detection circuit connected to another end of the above-mentioned signal line, a second control logic circuit, and a second driver. The zero-voltage detection circuit detects whether a both-ends voltage of the resonance capacitor is zero or not to produce a zero-voltage detected signal when the both-ends voltage of resonance capacitor is zero. The both-ends voltage of the resonance capacitor corresponds to the voltage detected signal. That is, the zero-voltage detection circuit is for detecting a zero-voltage on the basis of the voltage detected signal to produce the zero-voltage detected signal indicative of the zero-voltage. Responsive to the zero-voltage detected signal, the second control logic circuit produces an original low-side gate signal indicative of making the short-circuit switch turn on. Responsive to the original low-side gate signal, the second driver supplies a driving low-side gate signal to a control terminal of the short-circuit switch through a second signal line. The driving high-side gate signal corresponds to the second driving control signal.

In the conventional current resonance type DC/DC converter, in a case of really equipping the control circuit, a timing at which the energizing switch is really turned off after the zero-current detection circuit detects the zero-current of the current flowing through the resonance inductor is delayed from an optimal timing caused by a first delay time of the first control logic circuit and a second delay time of an output of the first driver resulting from an inductance component of the signal line and a gate capacitance of the energizing switch. As a result, the conventional current resonance type DC/DC converter is disadvantageous in that the loss in the energizing switch is increased.

In addition, the above-mentioned first and second delay times in the control circuit change dependent on various conditions such as the load current and an ambient temperature. It is therefore very difficult to preliminarily grasp the delay amount in the control circuit quantitatively.

Similarly, the conventional current resonance type DC/DC converter controls to make the short-circuit switch turn on when the both-ends voltage of the resonance capacitor becomes zero volt. However, there is a delay until the short-circuit switch is really tuned on after detection of a zero-voltage in the both-ends voltage of the resonance capacitor. Accordingly, the conventional current resonance type DC/DC converter is disadvantageous in that the loss in the short-circuit switch is also increased.

SUMMARY OF THE INVENTION

It is therefore an object of the present invention to provide a switching power supply and a control method thereof which are capable of always switching a switching element at an optimal timing.

Other objects of this invention will become clear as the description proceeds.

On describing the gist of a first aspect of this invention, it is possible to be understood that a switching power supply comprises a switching power portion including a switching element and a control circuit for controlling turning-on/off of the switching element. According to the first aspect of this invention, the control circuit comprises a delay correction circuit for correcting a delay involved for driving the switching element.

In the above-mentioned switching power supply according the first aspect of this invention, the switching power portion may comprise a current resonance type DC/DC converting portion. The current resonance type DC/DC converting portion may comprise a full-wave current resonance type DC/DC converting portion. The full-wave current resonance type DC/DC converting portion may comprise a step-down full-wave current resonance type DC/DC converting portion.

The current resonance type DC/DC converting portion may include a resonance circuit which consists of a resonance inductor and a resonance capacitor, the current resonance type DC/DC converting portion may comprise, as the switching element, an energizing switch for energizing the resonance inductor, the current resonance type DC/DC converting portion may including a current detection arrangement for detecting a current flowing through the energizing switch to produce a current detected signal, and the control circuit may including a zero-current detection circuit for detecting a zero-current on the basis of the current detected signal to produce a zero-current detected signal indicative of the zero-current. In this event, the delay correction circuit may produce a delay correction signal on the basis of the zero-current detected signal and a driving control signal for turning the energizing switch on/off. The delay correction circuit may produce the delay correction signal so that a timing for turning off the energizing switch by the driving control signal substantially coincides with an output timing of the zero-current detected signal.

More specifically, the delay correction circuit may comprise a reference voltage generating circuit for generating a reference voltage, a first comparator for comparing the reference voltage with the driving control signal to produce a first comparison result signal, an error signal generating circuit for generating a lag direction signal or a lead direction signal on the basis of the first comparison result signal and the zero-current detected signal, a voltage level error signal generating circuit for generating a voltage level error signal in response to the lag direction signal or the lead direction signal, a timer for producing a timer signal having a predetermined sawtooth waveform, and a second comparator for comparing the voltage level error signal with the timer signal to produce a second comparison result signal as the delay correction signal. The control circuit further may comprise a control logic circuit for producing, in response to the delay correction signal, an original control signal for making the energizing switch turn off, and a driver for supplying, in response to the original control signal, the driving control signal to a control terminal of the energizing switch.

In addition, the switching power portion may comprise a synchronous current resonance type DC/DC converting portion. The synchronous current resonance type DC/DC converting portion may include a resonance circuit which consists of a resonance inductor and a resonance capacitor, the synchronous current resonance type DC/DC converting portion may comprise, as the switching element, a short-circuit switch for short-circuiting the resonance capacitor, the synchronous current resonance type DC/DC converting portion may include a voltage detection arrangement for detecting a both-ends voltage of the resonance capacitor to produce a voltage detected signal, and the control circuit may include a zero-voltage detection circuit for detecting a zero-voltage on the basis of the voltage detected signal to produce a zero-voltage detected signal indicative of the zero-voltage. In this event, the delay correction circuit produces a delay correction signal on the basis of the zero-voltage detected signal and a driving control signal for turning the short-circuit switch on/off. The delay correction circuit produces the delay correction signal so that a timing for turning on the short-circuit switch by the driving control signal substantially coincides with an output timing of the zero-voltage detected signal. The control circuit further may comprise a control logic circuit for producing, in response to the delay correction signal, an original control signal for making the short-circuit switch turn on, and a driver for supplying, in response to the original control signal, the driving control signal to a control terminal of the short-circuit switch.

On describing the gist of a second aspect of this invention, it is possible to be understood that a method is for controlling a switching timing of a switching element by a control circuit for use in a switching power supply comprising a switching power portion including the switching element and the control circuit for controlling turning-on/off of the switching element. According to the second aspect of this invention, the method comprises the step of correcting a delay involved for driving the switching element.

According to the second aspect of this invention, the switching power portion may comprise a current resonance type DC/DC converting portion. The current resonance type DC/DC converting portion may comprise a full-wave current resonance type DC/DC converting portion. The full-wave current resonance type DC/DC converting portion may comprise a step-down full-wave current resonance type DC/DC converting portion.

The current resonance type DC/DC converting portion may include a resonance circuit which consists of a resonance inductor and a resonance capacitor, the current resonance type DC/DC converting portion may comprise, as the switching element, an energizing switch for energizing the resonance inductor, the current resonance type DC/DC converting portion may include a current detection arrangement for detecting a current flowing through the energizing switch to produce a current detected signal, and the control circuit may include a zero-current detection circuit for detecting a zero-current on the basis of the current detected signal to produce a zero-current detected signal indicative of the zero-current. In this event, the delay correction step may produce a delay correction signal on the basis of the zero-current detected signal and a driving control signal for turning the energizing switch on/off. The delay correction step may produce the delay correction signal so that a timing for turning off the energizing switch by the driving control signal substantially coincides with an output timing of the zero-current detected signal.

More specifically, the delay correction step may comprise the sub-steps of generating a reference voltage, of comparing the reference voltage with the driving control signal to produce a first comparison result signal, of generating a lag direction signal or a lead direction signal on the basis of the first comparison result signal and the zero-current detected signal, of generating a voltage level error signal in response to the lag direction signal or the lead direction signal, of producing a timer signal having a predetermined sawtooth waveform, and of comparing the voltage level error signal with the timer signal to produce a second comparison result signal as the delay correction signal. The control circuit further may comprise the steps of producing, in response to the delay correction signal, an original control signal for making the energizing switch turn off, and of supplying, in response to the original control signal, the driving control signal to a control terminal of the energizing switch.

In addition, the switching power portion may comprise a synchronous current resonance type DC/DC converting portion. The synchronous current resonance type DC/DC converting portion may include a resonance circuit which consists of a resonance inductor and a resonance capacitor, the synchronous current resonance type DC/DC converting portion may comprise, as the switching element, a short-circuit switch for short-circuiting the resonance capacitor, the synchronous current resonance type DC/DC converting portion may include a voltage detection arrangement for detecting a both-ends voltage of the resonance capacitor to produce a voltage detected signal, and the control circuit may include a zero-voltage detection circuit for detecting a zero-voltage on the basis of the voltage detected signal to produce a zero-voltage detected signal indicative of the zero-voltage. In this event, the delay correction step may produce a delay correction signal on the basis of the zero-voltage detected signal and a driving control signal for turning the short-circuit switch on/off. The delay correction step may produce the delay correction signal so that a timing for turning on the short-circuit switch by the driving control signal substantially coincides with an output timing of the zero-voltage detected signal. The control circuit further may comprise the steps of producing, in response to the delay correction signal, an original control signal for making the short-circuit switch turn on, and of supplying, in response to the original control signal, the driving control signal to a control terminal of the short-circuit switch.

BRIEF DESCRIPTION OF THE DRAWING

FIGS. 11A through 11E are a time chart for use in describing operation of a control circuit for use in the full-wave resonance type DC/DC converter illustrated in FIG. 10.

DESCRIPTION OF THE PREFERRED EMBODIMENTS

Figure 1:
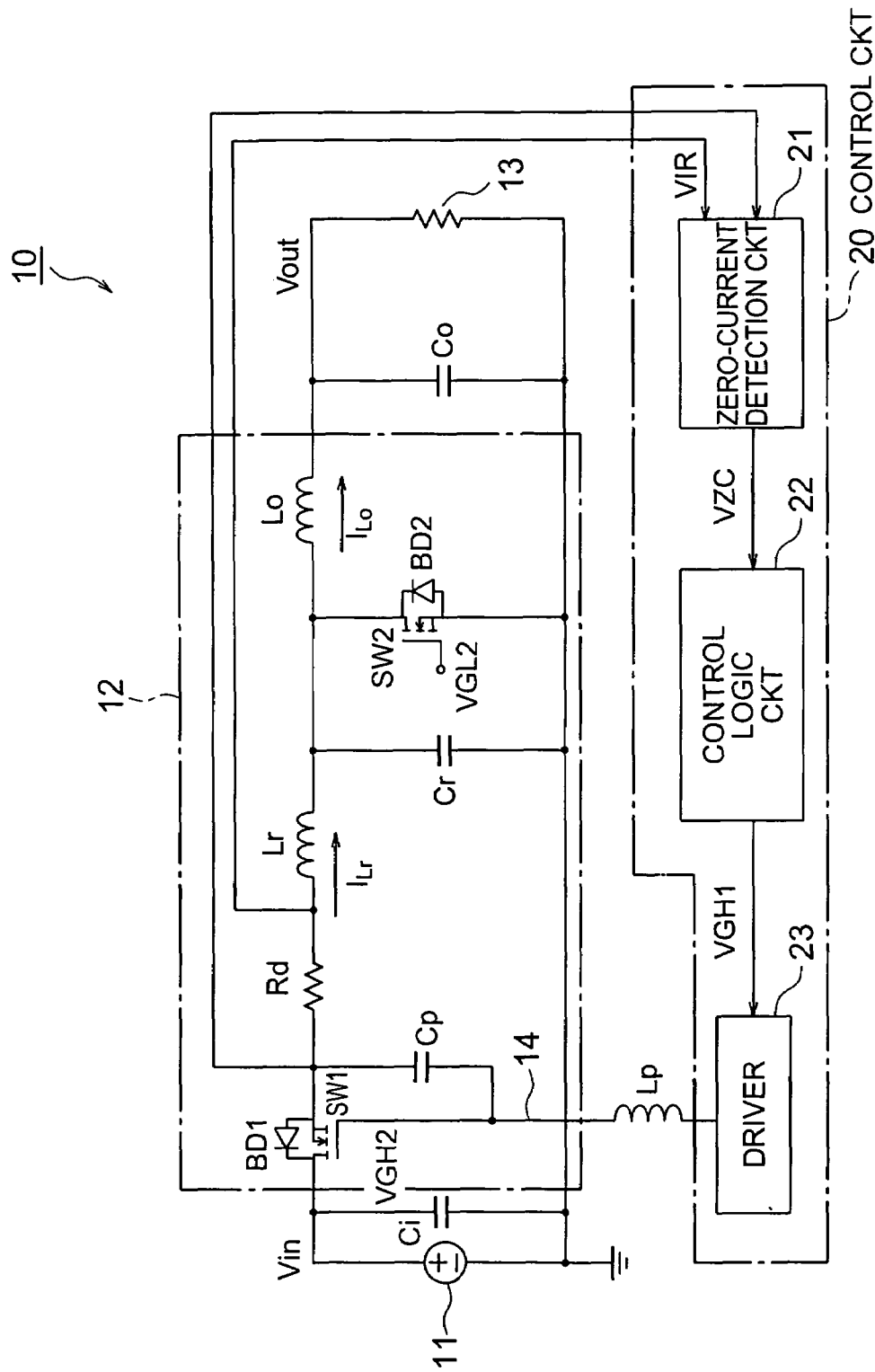
FIG. 1 is a block diagram showing structure of a first conventional full-wave current resonance DC/DC converter of a step-down type and a synchronous type.

Referring to FIG. 1, a first conventional current resonance type DC/DC converter 10 will first be described in order to facilitate an understanding of the present invention. In the example being illustrated, the current resonance type DC/DC converter 10 is a full-wave current resonance type DC/DC converter. The illustrated full-wave current resonance type DC/DC converter 10 is a step-down type and a synchronous type. That is, an output voltage Vout is lower than an input voltage Vin. An input power supply 11 is connected in parallel with an input capacitor Ci. A load 13 is connected in parallel with a capacitance element (an output capacitor) Co. Between the input capacitor Ci and the output capacitor Co, a full-wave current resonance type DC/DC converting portion 12 is connected.

The full-wave current resonance type DC/DC converting portion 12 comprises an energizing switch SW1, a short-circuit switch SW2, an output inductor Lo, a resonance inductor Lr, and a resonance capacitor Cr. A combination of the resonance inductor Lr and the resonance capacitor Cr constitutes a series resonance circuit. The series resonance circuit is inserted between the energizing switch SW1 and the short-circuit switch SW2.

In the illustrated full-wave current resonance type DC/DC converting portion 12, between the energizing switch SW1 and the resonance inductor Lr, a current detection resistor Rd is inserted. The current detection resistor Rd is for detecting a current $I_{Lr}$ flowing though the resonance inductor Lr.

The energizing switch SW1 is also called a first switch while the short-circuit switch SW2 is also called a second switch. Each of the energizing switch SW1 and the short-circuit switch SW2 comprises an N-channel metal oxide semiconductor field effect transistor (MOSFET). That is, each of the energizing switch SW1 and the short-circuit switch SW2 has a gate electrode as a control terminal and source and drain electrodes as a pair of main electrode terminals. A first body diode BD1 is parasitic on the first switch SW1 while a second body diode BD2 is parasitic on the second switch SW2. Each of the first and the second body diodes BD1 and BD2 is also called a parasitic diode.

More specifically, the energizing switch SW1 has a source electrode which is equivalently connected to an anode electrode of the first body diode BD1. The energizing switch SW1 has a drain electrode which is equivalently connected to a cathode electrode of the first body diode BD1. The short-circuit switch SW2 has a source electrode which is equivalently connected to an anode electrode of the second body diode BD2. The short-circuit switch SW2 has a drain electrode which is equivalently connected to a cathode electrode of the second body diode BD2.

That is, the full-wave current resonance type DC/DC converting portion 12 is similar in structure to the above-mentioned PWM type DC/DC converter except that the series resonance circuit consisting of the resonance inductor Lr and the resonance capacitor Cr is added.

The energizing switch (the first switch) SW1 has an end (the drain electrode) connected to a positive electrode of the input power supply 11. The energizing switch (the first switch) SW1 has another end (the source electrode) connected to an end of the resonance inductor Lr through the current detection resistor Rd. The resonance inductor Lr has another end which is grounded through the resonance capacitor Cr. The short-circuit switch (the second switch) SW2 is connected in parallel with the resonance capacitor Cr. Specifically, the short-circuit switch SW2 has an end (the drain electrode) connected to a connection node between the resonance inductor Lr and the resonance capacitor Cr. The short-circuit switch SW2 has another end (the source electrode) which is grounded. The other end of the resonance inductor Lr is also connected to an end of the output inductor Lo. The output inductor Lo has another end which is grounded through the output capacitor Co. The output capacitor Co has both ends between which the output voltage Vout occurs.

The first switch (the energizing switch) SW1 is also called a high-side switch while the second switch (the short-circuit switch) SW2 is also called a low-side switch. Control of turning on/off of the energizing switch SW1 and the short-circuit switch SW2 is carried out by first and second driving control signals VGH2 and VGL2 supplied from a control circuit 20. More specifically, the control circuit 20 supplies, as the first driving control signal, a driving high-side gate signal VGH2 to the gate electrode (the control terminal) of the energizing switch SW1 while the control circuit 20 supplies, as the second driving control signal, a driving low-side gate signal VGL2 to the gate electrode (the control terminal) of the short-circuit switch SW2.

Referring now to FIG. 1, description will be made as regards operation of the full-wave current resonance type DC/DC converter 10.

It will first be assumed that the first switch SW1 is put into an off state while the second switch SW2 is put into an on state. In this event, a current $I_{Lo}$ flowing through the output inductor Lo and a current $I_{SW2}$ flowing through the second switch SW2 linearly decrease at an inclination of −Vout/Lo.

Subsequently, it will be assumed that both of the first and the second switches SW1 and SW2 are put into the off state. A time duration where both of the first and the second switches SW1 and SW2 are put into the off state is called a dead time. For a duration of the dead time, the current $I_{SW2}$ flowing through the second switch SW2 becomes zero while a current $I_{BD2}$ flows through the second body diode BD2 in place of the second switch SW2.

It will be assumed that the first switch SW1 is turned on while the second switch SW2 is turned off. In this event, a current $I_{SW1}$ flowing through the first switch SW1 linearly increases at an inclination of Vin/Lo. On the other hand, the current $I_{BD2}$ flowing through the second body diode BD2 decreases with increase in the current $I_{SW1}$ flowing through the first switch SW1. Under the circumstances, a both-ends voltage $V_{Cr}$ of the resonance capacitor Cr is clamped to zero volt by the second body diode BD2.

At a time instant after a lapse of a first time interval T1= $(I_{Lo}Lr)/Vin$ from a time instant when the first switch SW1 is turned on, the current $I_{SW1}$ flowing through the first switch SW1 and a current $I_{Lo}$ flowing through the output inductor Lo are equal to each other, namely, $(I_{SW1}=I_{Lo})$, and then the series resonance circuit starts resonance. Accordingly, a current $I_{Cr}$ flowing in the resonance capacitor Cr increases gradually, reaches a peak, and thereafter decreases gradually. In this event, the both-end voltage $V_{Cr}$ of the resonance capacitor Cr increases gradually to become a voltage 2Vin which is twice as much as the input voltage Vin. When the current $I_{Cr}$ flowing in the resonance capacitor Cr reaches the peak, the both-ends voltage $V_{Cr}$ of the resonance capacitor Cr is equal to the input voltage Vin.

A second time interval T2 where the current $I_{Cr}$ flows in the resonance capacitor Cr (namely, a duration where the resonance capacitor Cr is charged) is equal to a half of the reciprocal of a resonance frequency fr defined by an inductance value of the resonance inductor Lr and a capacitance value of the resonance capacitor Cr, namely, $T2=\frac{1}{2}fr=\pi\sqrt{(LrCr)}$. When the current $I_{Cr}$ flowing in the resonance capacitor Cr is zero, the current $I_{SW1}$ flowing through the first switch SW1 and the current $I_{Lo}$ flowing through the output inductor Lo are equal to each other.

When the current $I_{SW1}$ flowing through the first switch SW1 is less than the current $I_{Lo}$ flowing through the output inductor Lo, the resonance capacitor Cr starts discharge to flow a discharge current $I_{Cr}$ out of the resonance capacitor Cr. Therefore, the both-end voltage $V_{Cr}$ of the resonance capacitor Cr turns to reduce gradually.

At a time instant when the current $I_{SW1}$ flowing through the first switch SW1 becomes zero, the first switch SW1 is turned off. That is, the first switch SW1 is subjected to a zero-current switching (ZCS). Thereafter, a current $I_{BD1}$ backflows to the input power supply 11 through the first body diode BD1. At a time instant when the current $I_{BD1}$ flowing back in the first body diode BD1 becomes zero, the resonance of the series resonance circuit stops.

Inasmuch as the current $I_{Cr}$ discharging from the resonance capacitor Cr and the current $I_{Lo}$ flowing through the output inductor Lo are equal to each other, namely, $I_{Lo}=I_{Cr}$ after a time instant when the current $I_{BD1}$ flowing through the first body diode BD1 becomes zero, the resonance capacitor Cr substantially discharges at a direct current fashion. Under the circumstances, the both-ends voltage $V_{Cr}$ of the resonance capacitor Cr linearly decreases at the inclination of $I_{Lo}$/Cr.

When the resonance capacitor Cr perfectly discharges, the current $I_{BD2}$ turns to flow through the second body diode BD2.

It will be assumed that the second switch SW2 is turned on while the first switch SW1 is put into the off state. In this even, the current $I_{SW2}$ flows through the second switch SW2. The current $I_{SW2}$ flowing through the second switch SW2 and the current $I_{Lo}$ flowing through the output indictor Lo are equal to each other.

Thereafter, the above-mentioned operation is repeated.

In the manner which is described above, the full-wave current resonance type DC/DC converter 10 turns the energizing switch SW1 off at a time instant when the current $I_{SW1}$ backflows to resonate and becomes zero again after the current $I_{SW1}$ flowing through the energizing switch SW1 becomes zero. In addition, for a duration where the both-ends voltage $V_{Cr}$ of the resonance capacitor Cr is zero volt, the short-circuit switch SW2 is put into the on state.

In addition, the current $I_{Lr}$ flows through the resonance inductor Lr only for a resonance duration with respect to a switching period. The current $I_{Lr}$ does not flow through the resonance inductor Lr for a duration obtained by removing the resonance duration from the switching period. When an input/output voltage ratio Vin/Vout becomes smaller, the switching period with respect to the resonance duration becomes longer. As a result, durations where the current $I_{Lr}$ does not flow through the resonance inductor Lr increase, as described, for example, in the above-mentioned U.S. Pat. No. 4,720,667 issued by Lee at al.

At any rate, the full-wave current resonance type DC/DC converter 10 illustrated in FIG. 1 has a large advantage where the zero-current switching (ZCS) of the first switch (the energizing switch) SW1 is enable by using a series resonance of the series resonance circuit consisting of the resonance inductor Lr and the resonance capacitor Cr, and it results in eliminating the switching loss.

In other words, generally, in the full-wave current resonance type DC/DC converter 10, the energizing switch SW1 is turned off on the moment at which a sum of the resonance current $I_{Lr}$ in the circuit and a load current becomes zero. That is, the reduction in the switching loss of the energizing switch SW1 is accomplished by performing the zero-current switching (ZCS).

Although FIG. 1 illustrates the control circuit 20 for controlling turning-on/off of the energizing switch SW1 and the short-circuit switch SW2, the control circuit 20 illustrated in FIG. 1 only shows a first control portion for controlling the turning-on/off of the energizing switch SW1. In other words, a second control portion for controlling the turning-on/off of the short-circuit switch SW2 is omitted from FIG. 1.

The first control portion of the control circuit 20 comprises a zero-current detection circuit 21 connected to both ends of the current detection resistor Rd, a first control logic circuit 22, and a first driver 23.

The zero-current detection circuit 21 detects whether a both-ends voltage VIR of the current detection resistor Rd is zero or not to produce a zero-current detected signal VZC when the both-ends voltage VIR is zero. In other words, the zero-current detection circuit 21 is for detecting a zero-current on the basis of the current detected signal VIR to produce the zero-current detected signal indicative of the zero-current. Responsive to the zero-current detected signal VZC, the first control logic circuit 22 produces an original high-side gate signal VGH1 indicative of making the energizing switch SW1 turn off. Responsive to the original high-side gate signal VGH1, the first driver 23 supplies a driving high-side gate signal VGH2 to the gate electrode of the energizing switch SW1 through a signal line 14. The driving high-side gate signal VGH2 corresponds to the first driving control signal.

Figure 2A:
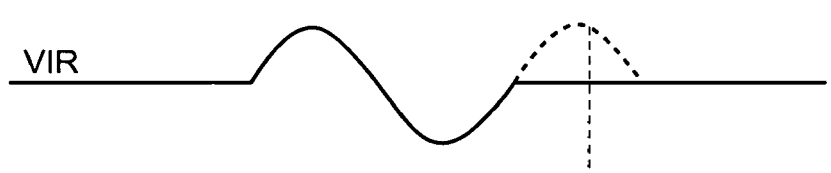
FIGS. 2A through 2D are a time chart for use in describing operation of a control circuit for use in the full-wave current resonance type DC/DC converter illustrated in FIG. 1.
Figure 2B:
Figure 2C:
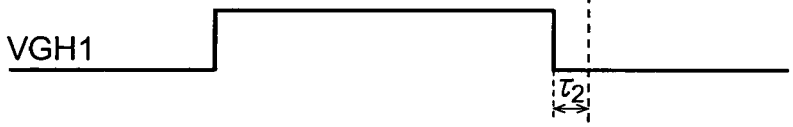
Figure 2D:
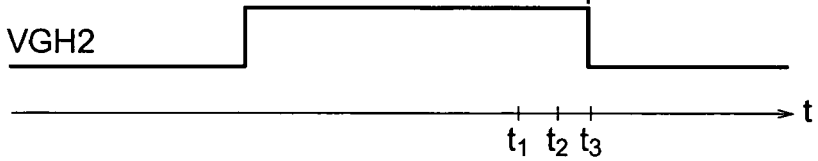

FIGS. 2A through 2D show an example of waveforms in respective portions in the first control portion of the control circuit 20 of the full-wave current resonance type DC/DC converter 10 illustrated in FIG. 1. FIG. 2A shows a waveform of the both-ends voltage (the current detected signal) VIR of the current detection resistor Rd. FIG. 2B shows a waveform of the zero-current detected signal VZC produced by the zero-current detection circuit 21. FIG. 2C shows a waveform of the original high-side gate signal VGH1 produced by the first control logic circuit 22. FIG. 2D shows a waveform of the driving high-side gate signal VGH2 supplied to the gate electrode of the energizing switch SW1.

As shown in FIG. 1, the signal line 14 between the first driver 23 and the energizing switch SW1 has an inductance component Lp and the energizing switch SW1 has a gate capacitance Cp. In addition, the first control logic circuit 22 has a first delay time $\tau_1$.

The zero-current detection circuit 21 detects that the current $I_{Lr}$ flowing through the resonance inductor Lr at a time instant $t_1$ to produce the zero-current detected signal VZC having a logic low level, as shown in FIG. 2B.

Responsive to the zero-current detected signal VZC having the logic low level, the first control logic circuit 22 produces the original high-side gate signal VGH1 having a logic low level at a time instant $t_2$ after a lapse of the first delay time $\tau_1$ specific to the first control logic circuit 22 from the time instant $t_1$, as shown in FIG. 2C.

Responsive to the original high-side gate signal VGH1 having the logic low level, the first driver 23 supplies the driving high-side gate signal VGH2 having a logic low level to the gate electrode of the energizing switch SW1 at a time instant $t_3$ after a lapse of a second delay time $\tau_2$ caused by a parasitic component due to the inductance component Lp of the signal line 14 and the gate capacitance Cp of the energizing switch SW1 from the time instant $t_2$.

In the manner which is described above, in the first conventional full-wave current resonance type DC/DC converter 10, in a case of really equipping the control circuit 20, a timing at which the energizing switch SW1 is really turned off after the zero-current detection circuit 21 detects the zero-current of the current $I_{Lr}$ flowing through the resonance inductor Lr is delayed from an optimal timing caused by the first delay time $\tau_1$ of the first control logic circuit 22 and the second delay time $\tau_2$ of an output of the first driver 23 resulting from the inductance component Lp of the signal line 14 and the gate capacitance Cp of he energizing switch SW1. As a result, the first conventional full-wave current resonance type DC/DC converter 10 is disadvantageous in that the loss in the energizing switch SW1 is increased, as mentioned in the preamble of the instant specification.

In addition, the above-mentioned first and second delay times $\tau_1$ and $\tau_2$ in the first control portion of the control circuit 20 change dependent on various conditions such as the load current and an ambient temperature. It is therefore very difficult to preliminarily grasp the delay amount ($\tau_1+\tau_2$) in the control circuit 20 quantitatively.

Figure 3:
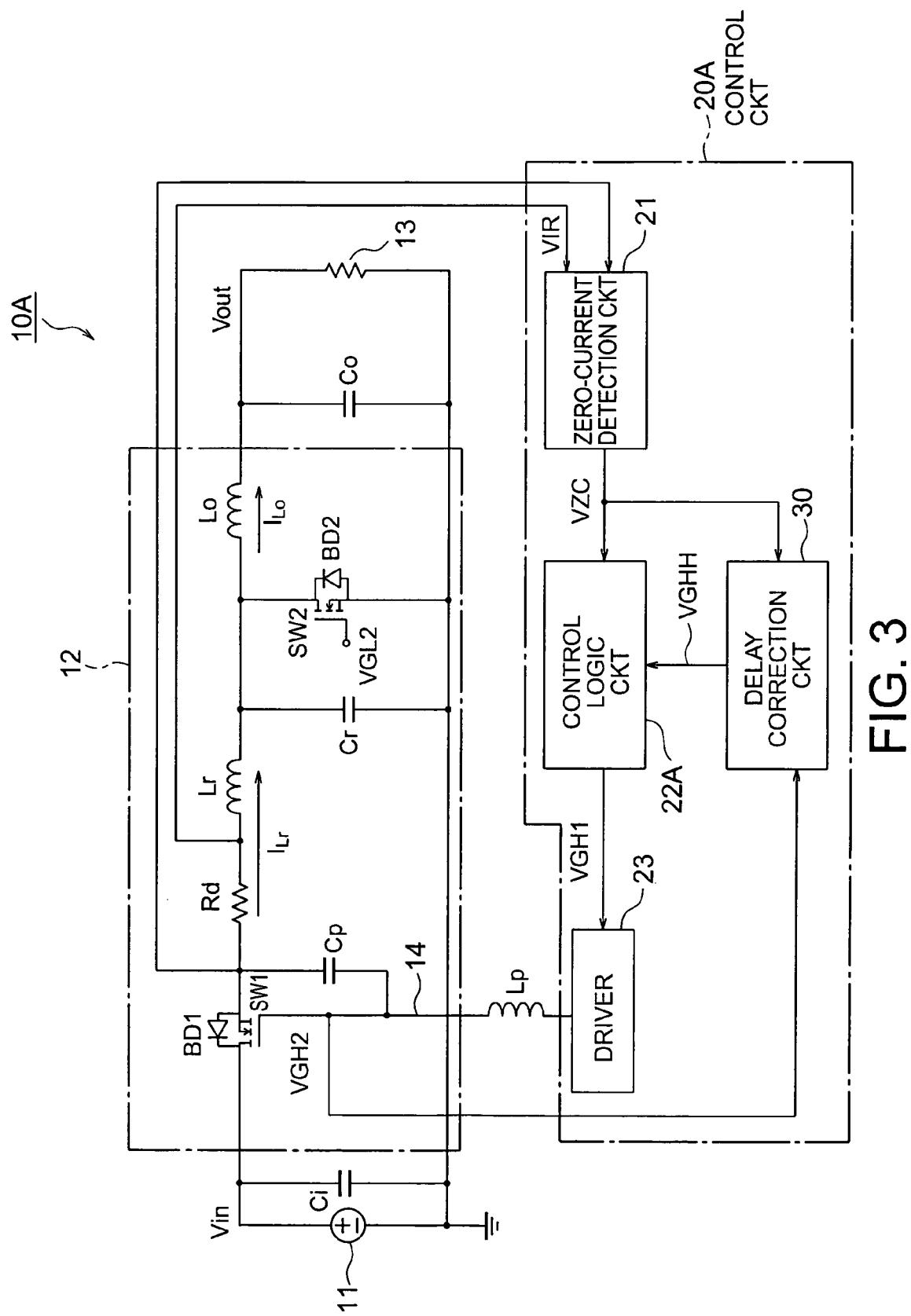
FIG. 3 is a block diagram showing structure of a full-wave current resonance type DC/DC converter of a step-down type and a synchronous type according to a first embodiment of this invention.

Referring to FIG. 3, the description will proceed to a current resonance type DC/DC converter 10A according to a first embodiment of this invention. The illustrated current resonance type DC/DC converter 10A is similar in structure to the current resonance type DC/DC converter 10 illustrated in FIG. 1 except that structure of the control circuit is different from that of the current resonance type DC/DC converter 10 illustrated in FIG. 1. Therefore, the control circuit is depicted at a reference symbol of 20A. In addition, those having functions similar to those illustrated in FIG. 1 are depicted at the same reference symbols.

The control circuit 20A is similar in structure to the control circuit 20 illustrated in FIG. 1 except that operation of the first control logic circuit is modified and the control circuit 20A further comprises a delay correction circuit 30. Therefore, the first logic control circuit is depicted at a reference symbol of 22A.

The delay correction circuit 30 is supplied with the driving high-side gate signal VGH2 and the zero-current detected signal VZC. The delay correction circuit 30 feedbacks, as an error amount, a time interval until the energizing switch SW1 is really turned off (until a trailing edge of the driving high-side error signal VGH2) from a trailing edge of the zero-current detected signal VZC and generates a high-side gate correction signal (a delay correction signal) VGHH. In other words, the delay correction circuit 30 is a circuit for correcting a delay involved for driving the energizing switch SW1 serves as the switching element.

The first control logic circuit 22A produces, in response to the original zero-current detected signal VZC, the original high-side gate signal VGH1 on the basis of the high-side gate correction signal VGHH.

Figure 4A:
FIGS. 4A through 4E are a time chart for use in describing operation of a control circuit for use in the full-wave resonance type DC/DC converter illustrated in FIG. 3.
Figure 4B:
Figure 4C:
Figure 4D:
Figure 4E:
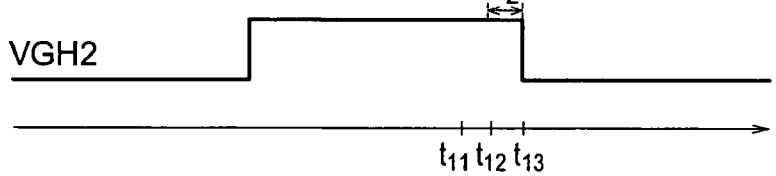

FIGS. 4A through 4E show an example of waveforms of the respective parts in the control circuit 20A of the full-wave current resonance type DC/DC converter 10A illustrated in FIG. 3. FIG. 4A shows a waveform of the both-ends voltage (the current detected signal) VIR of the current detection resistor Rd. FIG. 4B shows a waveform of the zero-current detected signal VZC produced by the zero-current detection circuit 21. FIG. 4C shows a waveform of the high-side gate correction signal VGHH generated from the delay correction circuit 30. FIG. 4D shows a waveform of the original high-side gate signal VGH1 produced by the first control logic circuit 22A. FIG. 5E shows a waveform of the driving high-side gate signal VGH2 supplied to the gate electrode of the energizing switch SW1.

In the manner which is described above, the delay correction circuit 30 feedbacks, as the error amount, the time interval ($\tau_1+\tau_2$) until the energizing switch SW1 is really turned off (until the trailing edge of the driving high-side error signal VGH2) from the trailing edge of the zero-current detected signal VZC and generates the high-side gate correction signal VGHH. Accordingly, as shown in FIGS. 4B and 4C, the delay correction circuit 30 changes the high-side gate correction signal VGHH from the logic high level to the logic low level at a time instant $t_{11}$ which is earlier than a time instant of the trailing edge of the zero-current detected signal VZC by a time interval corresponding to the error amount ($\tau_1+\tau_2$).

Responsive to the high-side gate correction VGHH having the logic low level, the first control logic circuit 22A produces the original high-side gate signal VGH1 having a logic low level at a time instant $t_{12}$ after a lapse of the first delay time $\tau_1$ specific to the first control logic circuit 22A from the time instant $t_{11}$, as shown in FIG. 4D.

Responsive to the original high-side gate signal VGH1 having the logic low level, the first driver 23 supplies the driving high-side gate signal VGH2 having a logic low level to the gate electrode of the energizing switch SW1 at a time instant $t_{13}$ after a lapse of the second delay time $\tau_2$ caused by the parasitic component due to the inductance component Lp of the signal line 14 and the gate capacitance Cp of the energizing switch SW1 from the time instant $t_{12}$.

Therefore, it is possible to turn the energizing switch SW1 off at the trailing edge of the zero-current detected signal VZC (i.e. an ideal zero-current point) by adding the respective delay times to a timing of the high-side gate correction signal VGHH.

Figure 5:
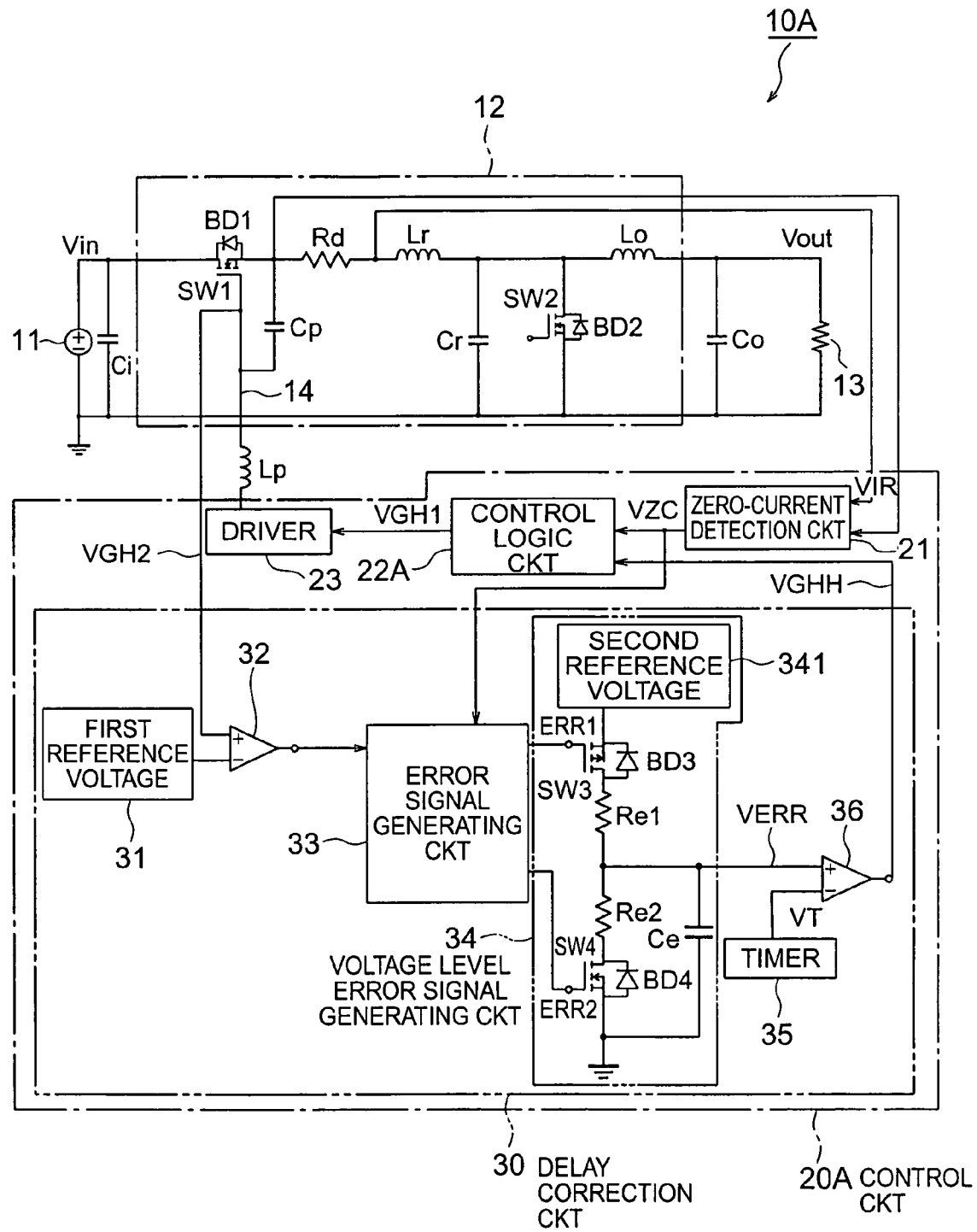
FIG. 5 is a block diagram showing a detailed example of a delay correction circuit in the control circuit for use in the full-wave resonance type DC/DC converter illustrated in FIG. 3.

Referring now to FIG. 5, the description will proceed to an example of the delay correction circuit 30 illustrated in FIG. 3.

The delay correction circuit 30 comprises a first reference voltage generating circuit 31, a first comparator 32, an error signal generating circuit 33, a voltage level error signal generating circuit 34, a timer 35, and a second comparator 36.

The first reference voltage generating circuit 31 generates a first reference voltage. The first reference voltage is supplied to the first comparator 32. The first comparator 32 is also supplied with the driving high-side gate signal VGH2. The first comparator 32 compares the first reference voltage with the driving high-side gate signal VGH2 to produce a first comparison result signal. Specifically, the first comparator 32 has an inverting input terminal supplied with the first reference voltage and a noninverting input terminal supplied with the driving high-side gate signal VGH2. When the driving high-side gate signal VGH2 is higher than the first reference voltage, the first comparator 32 produces the first comparison result signal having a logic high level. When the driving high-side gate signal VGH2 is lower than the first reference voltage, the first comparator 32 produces the first comparison result signal having a logic low level.

The first comparison result signal is supplied to the error signal generating circuit 33. The error signal generating circuit 33 is also supplied with the zero-current detected signal from the zero-current detection circuit 21. The error signal generating circuit 33 generates, on the basis of the first comparison result signal and the zero-current detected signal, first and second error signals ERR1 and ERR2, in the manner which will later be described. The first and the second error signals ERR1 and ERR2 are signals which indicates, as lengths on time base, a error magnitude (an error amount) between the first comparison result signal and the zero-current detected signal VZC. Accordingly, the first and the second error signals ERR1 and ERR2 are also called first and second time-base error signals, respectively.

More specifically, it will be assumed that the driving high-side gate signal VHG2 has an OFF point (a trailing edge) which is earlier than a zero-current point of the current flowing though the energizing switch SW1. In this event, the error signal generating circuit 33 generates the first error signal ERR1 having a logic low level for this duration. In other words, when the driving high-side gate signal VGH2 has the logic low level and the zero-current detected signal VZC has the logic high level, the error signal generating circuit 33 generates the first error signal ERR1 having the logic low level. Inasmuch as the first error signal ERR1 having the logic low level is a signal for directing the driving high-side gate signal to lag, the first error signal ERR1 is also called a lag direction signal.

Conversely, it will be assumed that the driving high-side gate signal VGH2 has the OFF point (the trailing edge) which is later than the zero-current point of the current flowing through the energizing switch SW2. In this event, the error signal generating circuit 33 produces the second error signal ERR2 having a logic high level for this duration. In other words, when the driving high-side gate signal VGH2 has the logic high level and the zero-current detected signal VZC has the logic low level, the error signal generating circuit 33 generates the second error signal ERR2 having the logic high level. Inasmuch as the second error signal ERR2 having the logic high level is a signal for directing the driving high-side gate signal to lead, the second error signal ERR2 is also called a lead direction signal.

The first and the second error signals ERR1 and ERR2 are supplied to the voltage level error signal generating circuit 34. The voltage level error signal generating circuit 34 generates a voltage level error signal VERR on the basis of the first and the second error signals ERR1 and ERR2.

More specifically, the voltage level error signal generating circuit 34 comprises a second reference voltage generating circuit 341, third and fourth switch SW3 and SW4, first and second resistors Re1 and Re2, and a capacitor Ce.

The second reference voltage generating circuit 341 generates a second reference voltage. The third switch SW3 comprises a P-channel metal oxide semiconductor field effect transistor (MOSFET) while the fourth switch SW4 comprises an N-channel metal oxide semiconductor field effect transistor (MOSFET). A third body diode (parasitic diode) BD3 is parasitic on the third switch SW3 while a fourth body diode (parasitic diode) BD4 is parasitic on the fourth switch SW4. The third switch SW3 has a drain electrode which is equivalently connected to an anode electrode of the third body diode BD3. The third switch SW3 has a source electrode which is equivalently connected to a cathode electrode of the third body diode BD4. The fourth switch SW4 has a source electrode which is equivalently connected to an anode electrode of the fourth body diode BD4. The fourth switch SW4 has a drain electrode which is equivalently connected to a cathode electrode of the fourth body diode BD4.

The third switch SW3 has a gate electrode which is supplied with the first error signal ERR1. The source electrode of the third switch SW3 is supplied with the second reference voltage from the second reference voltage generating circuit 341. Between the drain electrode of the third switch SW3 and the drain electrode of the fourth switch SW4, the first and the second resistors Re1 and Re2 are connected in series with each other. The fourth switch SW4 has a gate electrode which is supplied with the second error signal ERR2. The source electrode of the fourth switch SW4 is grounded. A connection node between the first and the second resistors Re1 and Re2 is connected to an end of the capacitor Ce. The capacitor Ce has another end which is grounded.

In the voltage level error signal generating circuit 34 having such a structure, when the first error signal ERR1 has the logic low level, the third switch SW3 is turned on and a current flows in the capacitor Ce through the first resistor Re1 from the second reference voltage generating circuit 341 to charge the capacitor Ce. Accordingly, the voltage level error signal generating circuit 34 generates the voltage level error signal VERR having a voltage level which rises. On the other hand, when the second error signal ERR2 has the logic high level, the fourth switch SW4 is turned on and electric charges accumulated in the capacitor Ce are discharged as a current flowing to a ground terminal through the second resistor RE2 to discharge the capacitor Ce. Accordingly, the voltage level error signal generating circuit 34 generates the voltage level error signal VERR having the voltage level which comes down. At any rate, the voltage level error signal generating circuit serves as a time-base/voltage level converting arrangement for converting the first and the second time-base error signals ERR1 and ERR2 into the voltage level error signal VERR.

The timer 35 generates a timer signal VT having a sawtooth waveform where its voltage level gradually rises and sharply comes down, which will be later be described.

The second comparator 36 is a circuit for comparing the timer signal VT with the voltage level error signal VERR to produce the high-side gate correction signal (the delay correction signal). More specifically, the second comparator 36 has an inverting input terminal supplied with the timer signal VT. The second comparator 36 has a noninverting input terminal supplied with the voltage level error signal VERR. When the timer signal VT is higher than the voltage level error signal VERR, the second comparator 36 produces the high-side gate correction signal (the delay correction signal) of the logic low level. Conversely, when the timer signal VT is lower than the voltage level error signal VERR, the second comparator 36 produces the high-side gate correction signal (the delay correction signal) of the logic high level.

Referring now to FIGS. 6A through 6H and 7A through 7H in addition to FIG. 5, description will be made as regards operation of the control circuit 20A in the current resonance type DC/DC converter 10A illustrated in FIG. 5.

FIGS. 6A through 6H are a time chart showing waveforms of the respective portions of the control circuit 20A in a case where the energizing switch SW1 is lately turned off after the current flowing through the energizing switch SW1 becomes zero. The case is hereafter called a first transient state. FIGS. 7A through 7H are a time chart showing waveforms of the respective portions of the control circuit 20A in another case where the energizing switch SW1 is early turned of before the current flowing through the energizing switch SW1 becomes zero. The other case is hereafter called a second transient state.

Figure 6A:
FIGS. 6A through 6H are a time chart showing waveforms of the respective portions of the control circuit in a case where an energizing switch is lately turned off after a current flowing through the energizing switch becomes zero.
Figure 6B:
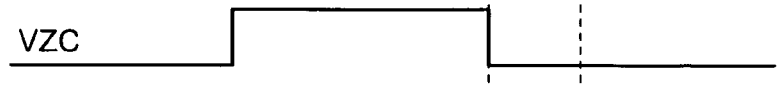
Figure 6C:
Figure 6D:
Figure 6E:
Figure 6F:
Figure 6G:
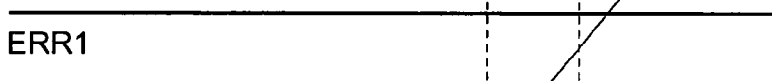
Figure 6H:
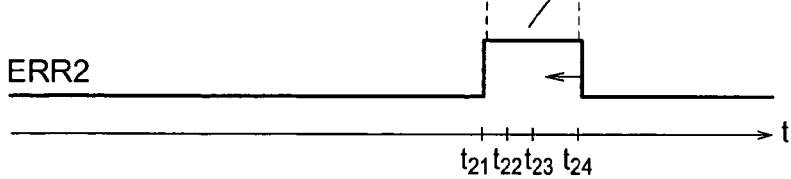
Figure 7A:
FIGS. 7A through 7H are a time chart showing waveforms of the respective portions of the control circuit in another case where the energizing switch is early turned of before the current flowing through the energizing switch becomes zero.
Figure 7B:
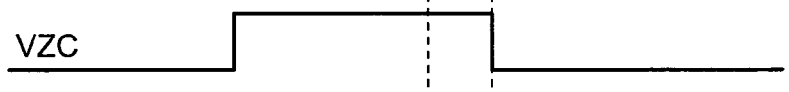
Figure 7C:
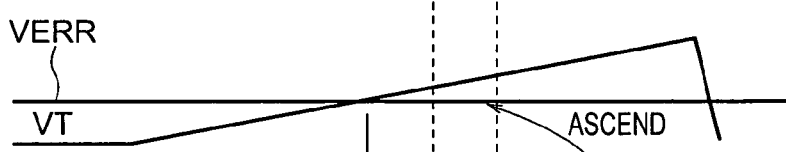
Figure 7D:
Figure 7E:
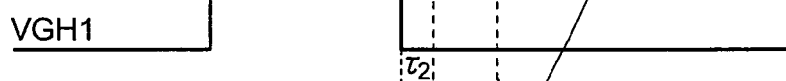
Figure 7F:
Figure 7G:
Figure 7H:
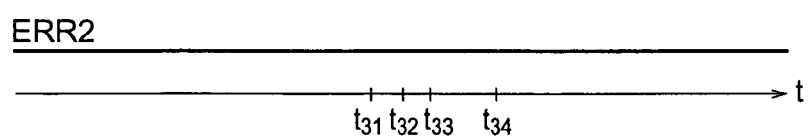

Each of FIGS. 6A and 7A shows a waveform of the both-ends voltage (the current detected signal) VIR of the current diction resistor Rd. Each of FIGS. 6B and 7B shows a waveform of the zero-current detected signal VZC produced by the zero-current detection circuit 21. Each of FIGS. 6C and 7C shows a waveform of the timer signal VT produced by the timer 35 and a waveform of the voltage level error signal VERR generated from the voltage level error signal generating circuit 34. Each of FIGS. 6D and 7D shows a waveform of the high-side gate correction signal (the delay correction signal) VGHH produced by the second comparator 36. Each of FIGS. 6E and 7E shows a waveform of the original high-side gate signal VGH1 produced by the first control logic circuit 22A. Each of FIGS. 6F and 7F shows a waveform of the driving high-side gate signal (the driving control signal) produced by the first driver 23. Each of FIGS. 6G and 7G shows a waveform of the first error signal (the lag direction signal) ERR1 generated from the error signal generating circuit 33. Each of FIGS. 6H and 7H shows a waveform of the second error signal (the lead direction signal) ERR2 generated from the error signal generating circuit 33.

Referring first to FIGS. 6A through 6H, the description will be made as regards operation in a case where the current resonance type DC/DC converter 10A is put into the first transient state.

In this event, when a time t is equal to a time instant $t_{21}$, the both-ends voltage VIR of the current detection resistor Rd becomes zero volt. Accordingly, the zero-current detection circuit 21 changes the zero-current detected signal VZC from the logic high level to the logic low level.

Inasmuch as the voltage level of the voltage level error signal VERR generated from the voltage level error signal generating circuit 34 is higher than a regular level in the first transient state at the time instant $t_{21}$, the voltage level of the voltage level error signal VERR is higher than the timer signal VT, as shown in FIG. 6C. Accordingly, the high-side gate correction signal VGHH produced by the second comparator 36 maintains the logic high level (see FIG. 6D). Therefore, both of the original high-side gate signal VGH1 produced by the first control logic circuit 22A and the driving high-side gate signal VGH2 produced by the first driver 23 maintain the logic high level (see FIGS. 6E and 6F).

Inasmuch as the driving high-side gate signal VGH2 has the logic high level, the first comparator 32 produces the first comparison result signal having the logic high level. Inasmuch as the first comparison result signal takes the logic high level and the zero-current detected signal VZC takes the logic low level, the error signal generating circuit 33 generates the second error signal ERR2 having the logic high level, as shown in FIG. 6H.

Responsive to the second error signal ERR2 having the logic high level, the fourth switch SW4 in the voltage level error signal generating circuit 34 is turned on. As a result, the electric charges accumulated in the capacitor Ce flows, as the current, to the grounding terminal through the second resistor Re2 to discharge the capacitor Ce and it result in descending the voltage level of the voltage level error signal VERR. Accordingly, an intersection point (e.g. the trailing edge of the high-side gate correction signal VGH) between the timer signal VT and the voltage level error signal VERR becomes earlier and the driving high-side gate signal VGH2 is corrected so as to shorten a duration of the logic high level of the second error signal ERR2.

When the time t becomes a time instant $t_{22}$, the voltage level of the timer signal VT is higher than the voltage level of the voltage level error signal VERR. Therefore, the second comparator 36 changes the high-side gate correction signal (the delay correction signal) VGHH from the logic high level to the logic low level.

Responsive to the high-side gate correction signal (the delay correction signal) VGHH, at a time instant $t_{23}$ after a lapse of the first delay time $\tau_1$ specific to the control logic circuit 22A from the time instant $t_{22}$, the control logic circuit 22A changes the original high-side gate signal VGH1 from the logic high level to the logic low level (see FIG. 6E).

Responsive to the original high-side gate signal VGH1, at a time instant $t_{24}$ after a lapse of the second delay time $\tau_2$ due to the above-mentioned parasitic component from the time instant $t_{23}$, the driver 23 changes the driving high-side gate signal VGH2 from the logic high level to the logic low level.

Responsive to the driving high-side gate signal VGH2 having the logic low level, the energizing switch SW1 is turned off. Inasmuch as the current does not flow through the energizing switch SW2, the both-ends voltage VIR of the current detection resistor Rd becomes zero. In addition, inasmuch as the driving high-side gate signal VGH2 becomes the logic low level, the first comparator 32 produces the first comparison result signal having the logic low level. Inasmuch as both of the first comparison result signal and the zero-current detected signal VZC have the logic low level, the error signal generating circuit 33 changes the second error signal (the lead direction signal) ERR2 from the logic high level to the logic low level. Responsive to the second error signal (the lead direction signal) ERR2 having the logic low level, the fourth switch SW4 is turned off to stop discharging of the capacitor Ce.

At any rate, inasmuch as the capacitor Ce discharges for the duration where the second error signal ERR2 has the logic high level between the time instant $t_{21}$ and the time instant $t_{24}$, the voltage level of the voltage level error signal VERR comes down. Therefore, the intersection point between the timer signal VT and the voltage level error signal VERR becomes earlier and the driving high-side gate signal VGH2 is corrected so as to shorten the duration where the second error signal ERR2 takes the logic high level. That is to say, by such a feedback loop, the driving high-side gate signal VGH2 produced by the driver 23 is controlled so that the off timing of the driving high-side gate signal VGH2 converges near a time instant of the zero-current in the current flowing through the energizing switch SW1.

Referring now to FIGS. 7A through 7H, the description will be made as regards operation in another case where the current resonance type DC/DC converter 10A is put into the second transient state. In the second transient state, the voltage level of the voltage level error signal VERR generated from the voltage level error signal generating circuit 34 is too lower than the regular level.

Accordingly, at a time instant $t_{31}$ far before the both-ends voltage VIR of the current diction resistor Rd becomes zero volt, the voltage level of the timer signal VT becomes higher than the voltage level of the voltage level error signal VERR (see FIG. 7C). As a result, the second comparator 36 changes the high-side gate correction signal (the delay correction signal) VGHH from the logic high level to the logic low level (see FIG. 7D).

Responsive to the high-side gate correction signal (the delay correction signal) VGHH, at a time instant $t_{32}$ after a lapse of the first delay time $\tau_1$ specific to the control logic circuit 22A from the time instant $t_{31}$, the first control logic circuit 22A changes the original high-side gate signal VGH1 from the logic high level to the logic low level (see FIG. 7E).

Responsive to the original high-side gate signal VGH1, at a time instant $t_{33}$ after a lapse of the second delay time $\tau_2$ due to the above-mentioned parasitic component from the time instant $t_{32}$, the first driver 23 changes the driving high-side gate signal VGH2 from the logic high level to the logic low level. Responsive to the driving high-side gate signal VGH2 having the logic low level, the energizing switch SW1 is turned off.

At the time instant $t_{33}$, the current flowing through the resonance inductor Lr has a negative value (in the reverse opposite direction), namely, in a direction toward the energizing switch SW1 through the resonance inductor Lr from the resonance capacitor Cr. Therefore, the current keeps on flowing through the first body diode BD1 which is the parasitic diode of the energizing switch SW1.

Inasmuch as the driving high-side gate signal VGH2 has the logic low level, the first comparator 32 produces the first comparison result signal having the logic low level. On the other hand, inasmuch as the current flowing through the energizing switch SW1 has the negative value in the manner which is described above, the both-end voltage VIR of the current detection resistor Rd has a negative value and then the zero-current detection circuit 21 produces the zero-current detected signal VZC of the logic high level (see FIG. 7B). Inasmuch as the first comparison result signal takes the logic low level and the zero-current detected signal VZC takes the logic high level, the error signal generating circuit 33 generates the first error signal ERR1 having the logic low level, as shown in FIG. 7G.

Responsive to the first error signal ERR1 having the logic low level, the third switch SW3 in the voltage level error signal generating circuit 34 is turned on. As a result, the current flows in the capacitor Ce through the first resistor Re1 from the second reference voltage generating circuit 341 to charge the capacitor Ce. As a result, the voltage level of the voltage level error signal VERR ascends.

Accordingly, an intersection point (e.g. the trailing edge of the high-side gate correction signal VGHH) between the timer signal VT and the voltage level error signal VERR becomes later and the driving high-side gate signal VGH2 is corrected so as to shorten a duration of the logic low level of the first error signal ERR1.

When the time t becomes a time instant $t_{34}$, the current flowing through the energizing switch SW1 becomes zero and then the both-ends voltage VlR of the current detection resistor Rd becomes zero. Accordingly, the zero-current detection circuit 21 changes the zero-current detected signal VZC from the logic high level to the logic low level. At the time instant $t_{34}$, inasmuch as both of the zero-current detected signal VZC and the first comparison result signal become the logic low level, the error signal generating circuit 33 changes the first error signal ERR1 from the logic low level to the logic high level.

At any rate, inasmuch as the third switch SW3 is turned on to charge the capacitor Ce for the duration where the first error signal ERR1 has the logic low level between the time instant $t_{33}$ and the time instant $t_{34}$, the voltage level of the voltage level error signal VERR comes up. As a result, the intersection point (the trailing edge of the high-side gate correction signal VGHH) between the timer signal VT and the voltage level error signal VERR becomes later and the driving high-side gate signal VGH2 is corrected so as to shorten the duration where the first error signal ERR1 takes the logic low level. That is to say, by such a feedback loop, the driving high-side gate signal VGH2 produced by the first driver 23 is controlled so that the off timing of the driving high-side gate signal VGH2 converges near a time instant of the zero-current in the current flowing through the energizing switch SW1.

In the manner which is described above, by adding the delay correction circuit 30 to the control circuit 20A, it is possible to always perform an optimal zero-current switching (ZCS). In addition, inasmuch as the control circuit 20A according to the first embodiment of this invention constitutes the feedback loop, it is possible to always keep an optimal condition with regard to a change of environmental such as an ambient temperature in the current resonance type DC/DC converter 10A. Furthermore, in a case where there is unevenness in characteristic of the energizing switch SW1 used individually, it is possible to keep the optimal condition because the delay correction circuit 30 absorbs the unevenness.

Although parts having very different characteristic are used as components of the current resonance type DC/DC converter 10A, it is possible to keep the optimal condition if those characteristics are within a band of the feedback loop of the control circuit 20A. Therefore, it is not necessary to modify the fundamental design of the current resonance type DC/DC converter 10A in a case where the parts are selected in accordance with specification or cost required of the current resonance type DC/DC converter 10A.

Although the full-wave current resonance type DC/DC converter 10A of the synchronous type is exemplified in the above-mentioned first embodiment of this invention, the full-wave current resonance type DC/DC converter may be an asynchronous type. In a case of the asynchronous type, a diode is used in place of the short-circuit switch SW2.

Figure 8:
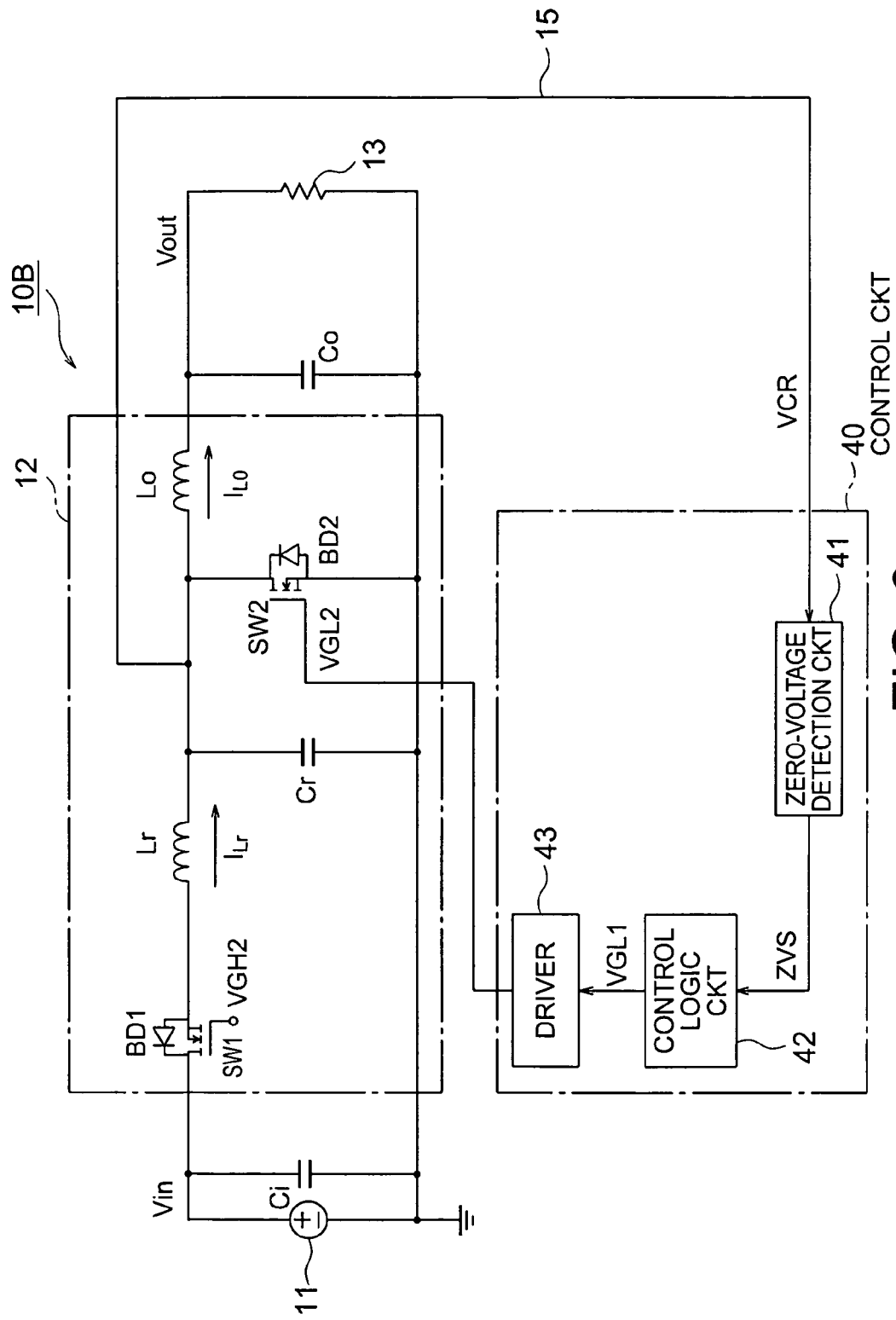
FIG. 8 is a block diagram showing structure of a second conventional full-wave current resonance DC/DC converter of a step-down type and a synchronous type.

Referring to FIG. 8, a second conventional current resonance type DC/DC converter 10B will be described in order to facilitate an understanding of the present invention. In the example being illustrated, the current resonance type DC/DC converter 10B is a full-wave current resonance type DC/DC converter. The illustrated full-wave current resonance type DC/DC converter 10B is a step-down type and a synchronous type. That is, an output voltage Vout is lower than an input voltage Vin.

The illustrated second conventional current resonance type DC/DC converter 10B is similar in structure to the first conventional current resonance type DC/DC converter 10 illustrated in FIG. 1 except that structure of the control circuit is different from that of the current resonance type DC/DC converter 10 illustrated in FIG. 1. Therefore, the control circuit is depicted at a reference symbol of 40.

The control circuit 40 comprises the above-mentioned second control portion for controlling the turning-on/off of the short-circuit switch SW2.

The second control portion of the control circuit 40 comprises a zero-voltage detection circuit 41, a second control logic circuit 42, and a second driver 43. The zero-voltage detection circuit 41 is connected through a signal line 15 to a connection node between the resonance inductor Lr and the resonance capacitor Cr. That is, the signal line 15 serves as a voltage detection arrangement for detecting a both-ends voltage $V_{Cr}$ of the resonance capacitor Cr to produce a voltage detected signal VCR.

The zero-voltage detection circuit 41 detects whether the both-ends voltage (the voltage detected signal) VCR of the resonance capacitor Cr is zero or not to produce a zero-voltage detected signal ZVS when the both-ends voltage VCR of the resonance capacitor Cr is zero. In other words, the zero-voltage detection circuit 41 is for detecting a zero-voltage on the basis of the voltage detected signal VCR to produce the zero-current detected signal ZVS indicative of the zero-current. Responsive to the zero-voltage detected signal ZVS, the second control logic circuit 42 produces an original low-side gate signal VGL1 indicative of making the short-circuit switch SW2 turn on. Responsive to the original low-side gate signal VGL1, the second driver 43 supplies a driving low-side gate signal VGL2 to the gate electrode of the short-circuit switch SW2. The driving low-side gate signal VGL2 corresponds to the second driving control signal.

Figure 9A:
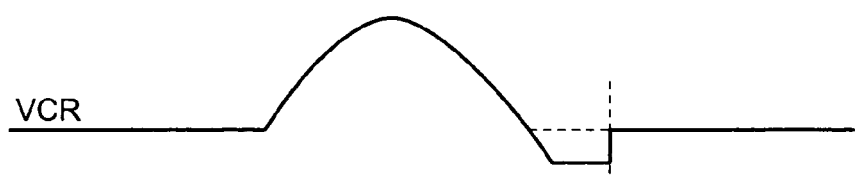
FIGS. 9A through 9D are a time chart for use in describing operation of a control circuit for use in the full-wave current resonance type DC/DC converter illustrated in FIG. 8.
Figure 9B:
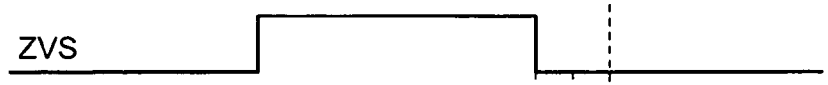
Figure 9C:
Figure 9D:
Figure 9D:
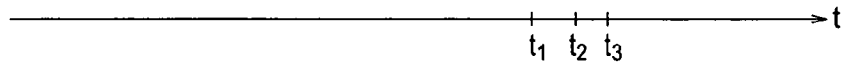

FIGS. 9A through 9D show an example of waveforms in respective portions in the second control portion of the control circuit 40 of the full-wave current resonance type DC/DC converter 10B illustrated in FIG. 8. FIG. 9A shows a waveform of the both-ends voltage (the voltage detected signal) VCR of the resonance capacitor Cr. FIG. 9B shows a waveform of the zero-voltage detected signal ZVS produced by the zero-voltage detection circuit 41. FIG. 9C shows a waveform of the original low-side gate signal VGL1 produced by the second control logic circuit 42. FIG. 9D shows a waveform of the driving low-side gate signal VGL2 supplied to the gate electrode of the short-circuit switch SW2.

A signal line between the second driver 43 and the short-circuit switch SW2 has an inductance component and the short-circuit switch SW2 has a gate capacitance. In addition, the second control logic circuit 42 has a first delay time $\tau_1$.

The zero-voltage detection circuit 41 detects that the both-ends voltage $V_{Cr}$ of the resonance capacitor Cr becomes zero volt at a time instant $t_1$ to produce the zero-voltage detected signal ZVS having a logic low level, as shown in FIG. 9B.

Responsive to the zero-voltage detected signal ZVS having the logic low level, the second control logic circuit 42 produces the original low-side gate signal VGL1 having a logic high level at a time instant $t_2$ after a lapse of the first delay time $\tau_1$ specific to the second control logic circuit 42 from the time instant $t_1$, as shown in FIG. 9C.

Responsive to the original low-side gate signal VGL1 having the logic high level, the second driver 43 supplies the driving low-side gate signal VGL2 having a logic high level to the gate electrode of the short-circuit switch SW2 at a time instant $t_3$ after a lapse of a second delay time $\tau_2$ caused by a parasitic component due to the inductance component of the above-mentioned signal line and the gate capacitance of the short-circuit switch SW2 from the time instant $t_2$.

In the manner which is described above, in the second conventional full-wave current resonance type DC/DC converter 10B, in a case of really equipping the control circuit 40, a timing at which the short-circuit switch SW2 is really turned on after the zero-voltage detection circuit 41 detects the zero-voltage of the both-ends voltage $V_{Cr}$ of the resonance capacitor Cr is delayed from an optimal timing caused by the first delay time $\tau_1$ of the second control logic circuit 42 and the second delay time $\tau_2$ of an output of the second driver 43 resulting from the inductance component of the signal line and the gate capacitance of the short-circuit switch SW2. As a result, the second conventional full-wave current resonance type DC/DC converter 10B is disadvantageous in that the loss in the short-circuit switch SW2 is increased. This is because a current $I_{BD2}$ flows through the second body diode BD2 for a duration between the time instant $t_1$ and the time instant $t_3$, as shown in FIG. 9A.

In addition, the above-mentioned first and second delay times $\tau_1$ and $\tau_2$ in the second control portion of the control circuit 40 change dependent on various conditions such as the load current and an ambient temperature. It is therefore very difficult to preliminarily grasp the delay amount $(\tau_1+\tau_2)$ in the control circuit 40 quantitatively.

At any rate, it is desired that the second conventional full-wave current resonance type DC/DC converter 10B controls to make the short-circuit switch SW2 turn on when the both-ends voltage $V_{Cr}$ of the resonance capacitor Cr becomes zero volt. In spite of such control, there is a delay $(\tau_1+\tau_2)$ until the short-circuit switch SW2 is really tuned on after detection of a zero-voltage in the both-ends voltage $V_{Cr}$ of the resonance capacitor Cr. Accordingly, the second conventional full-wave current resonance type DC/DC converter 10B is disadvantageous in that the loss in the short-circuit switch SW2 is also increased, as mentioned also in the preamble of the instant specification.

Figure 10:
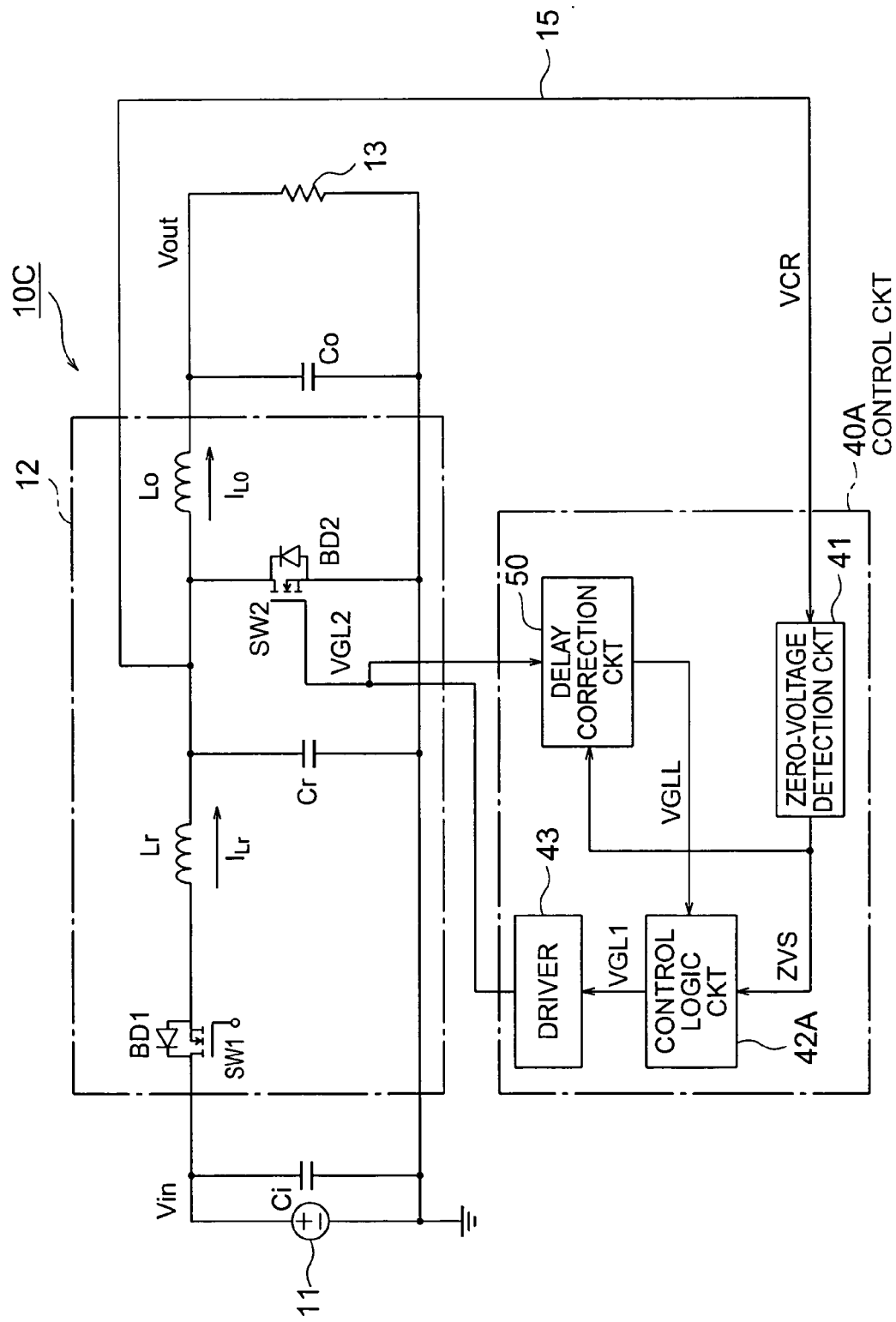
FIG. 10 is a block diagram showing structure of a full-wave current resonance type DC/DC converter of a step-down type and a synchronous type according to a second embodiment of this invention.

Referring to FIG. 10, the description will proceed to a current resonance type DC/DC converter 10C according to a second embodiment of this invention. The illustrated current resonance type DC/DC converter 10C is similar in structure to the current resonance type DC/DC converter 10B illustrated in FIG. 8 except that structure of the control circuit is different from those of the current resonance type DC/DC converter 10B illustrated in FIG. 8. Therefore, the control circuit is depicted at a reference symbol of 40A. In addition, those having functions similar to those illustrated in FIG. 8 are depicted at the same reference symbols.

The control circuit 40A is similar in structure to the control circuit 40 illustrated in FIG. 8 except that operation of the second control logic circuit is modified and the control circuit 40A further comprises a delay correction circuit 50. Therefore, the second logic control circuit is depicted at a reference symbol of 42A.

The delay correction circuit 50 is supplied with the driving low-side gate signal VGL2 and the zero-voltage detected signal ZVS. The delay correction circuit 50 feedbacks, as an error amount, a time interval until the short-circuit switch SW2 is really turned on (until a trailing edge of the driving low-side error signal VGL2) from a trailing edge of the zero-voltage detected signal ZVS and generates a low-side gate correction signal (a delay correction signal) VGLL. In other words, the delay correction circuit 50 is a circuit for correcting a delay involved for driving the short-circuit switch SW2 serves as the switching element.

The second control logic circuit 42A produces, in response to the zero-voltage detected signal ZVS, the original low-side gate signal VGL1 on the basis of the low-side gate correction signal VGLL.

FIGS. 11A through 11E show an example of waveforms of the respective parts in the control circuit 40A of the full-wave current resonance type DC/DC converter 10C illustrated in FIG. 10. FIG. 11A shows a waveform of the both-ends voltage (the voltage detected signal) VCR of the resonance capacitor Cr. FIG. 11B shows a waveform of the zero-voltage detected signal ZVS produced by the zero-voltage detection circuit 41. FIG. 11C shows a waveform of the low-side gate correction signal VGLL generated from the delay correction circuit 50. FIG. 11D shows a waveform of the original low-side gate signal VGL1 produced by the second control logic circuit 42A. FIG. 11E shows a waveform of the driving low-side gate signal VGL2 supplied to the gate electrode of the short-circuit switch SW2.

In the manner which is described above, the delay correction circuit 50 feedbacks, as the error amount, the time interval $(\tau_1+\tau_2)$ until the short-circuit switch SW2 is really turned on (until the trailing edge of the driving low-side error signal VGL2) from the trailing edge of the zero-voltage detected signal ZVS and generates the low-side gate correction signal VGLL. Accordingly, as shown in FIGS. 11B and 11C, the delay correction circuit 50 changes the low-side gate correction signal VGLL from the logic low level to the logic high level at a time instant $t_{11}$ which is earlier than a time instant of the trailing edge of the zero-voltage detected signal ZVS by a time interval corresponding to the error amount $(\tau_1+\tau_2)$.

Responsive to the low-side gate correction signal VGLL having the logic high level, the second control logic circuit 42A produces the original low-side gate signal VGL1 having a logic high level at a time instant $t_{12}$ after a lapse of the first delay time $\tau_1$ specific to the second control logic circuit 42A from the time instant $t_{11}$, as shown in FIG. 11D.

Responsive to the original low-side gate signal VGL1 having the logic high level, the second driver 43 supplies the driving low-side gate signal VGL2 having a logic high level to the gate electrode of the short-circuit switch SW2 at a time instant $t_{13}$ after a lapse of the second delay time $\tau_2$ caused by the parasitic component due to the inductance component of the signal line and the gate capacitance of the short-circuit switch SW2 from the time instant $t_{12}$.

It is therefore possible to turn the short-circuit switch SW2 on at the trailing edge of the zero-voltage detected signal ZVS (i.e. an ideal zero-voltage point) by adding the respective delay times to a timing of the low-side gate correction signal VGLL.

In the above-mentioned synchronous full-wave current resonance type DC/DC converter 10C, it is possible to minimize loss in the short-circuit switch SW2 if the short-circuit switch SW2 is turned on the instant at which the both-ends voltage $V_{Cr}$ of the resonance capacitor Cr becomes zero volt. Accordingly, in this control operation, by adding a delay correction loop of the above-mentioned delay correction circuit 50 to the control circuit 40A, it is possible for the synchronous full-wave current resonance type DC/DC converter 10C to always maintain the optimal condition without being dependent on part characteristics, characteristic of ambient temperatures, and so on.

Although the MOSFETs are used as the switches in the example being illustrated in FIGS. 3 and 5, and 10, bipolar transistors, junction FETs, or the like are used as the switches.

While this invention has thus far been described in conjunction with a few preferred embodiments thereof, it will now readily possible for those skilled in the art to put this invention into various manners. For example, although the full-wave current resonance type DC/DC converters of the step-down type are exemplified in the above-mentioned embodiments, this invention may be applicable to a step-up type, a polarity reversing type, or other types.

In other switching power supplies except the above-mentioned current-resonance type DC/DC converters, a delay of a switching timing occurs almost without exception caused by a parasitic capacitance of the switching element. By correcting such a delay of the switching timing by adding the above-mentioned delay correction circuit to a control circuit, it is possible to easily actualize a safety optimal switching.

What is claimed is:

1. A switching power supply comprising:
   a switching power portion including a switching element and a control circuit for controlling turning-on/off of said switching element,
   wherein said switching power portion comprises a current resonance type DC/DC converting portion, and said current resonance type DC/DC converting portion comprises: (i) a resonance circuit that includes a resonance inductor and a resonance capacitor, (ii) an energizing switch, as said switching element, for energizing said resonance inductor, and (iii) a current detection arrangement for detecting a current flowing through said energizing switch to produce a current detected signal,
   wherein said control circuit comprises a zero-current detection circuit for detecting a zero-current based on the current detected signal to produce a zero-current detected signal indicative of the zero-current, and said control circuit comprises a delay correction circuit for correcting a delay involved in driving said energizing switch,
   wherein said delay correction circuit produces a delay correction signal based on the zero-current detected signal and a driving control signal for turning said energizing switch on/off, and said delay correction circuit produces the delay correction signal so that a timing for turning off said energizing switch by the driving control signal substantially coincides with an output timing of the zero-current detected signal.

2. The switching power supply as claimed in claim 1, wherein said current resonance type DC/DC converting portion comprises a full-wave current resonance type DC/DC converting portion.

3. The switching power supply as claimed in claim 2, wherein said full-wave current resonance type DC/DC converting portion comprises a step-down full-wave current resonance type DC/DC converting portion.

4. The switching power supply as claimed in claim 1, wherein said delay correction circuit comprises:
   a reference voltage generating circuit for generating a reference voltage;
   a first comparator for comparing the reference voltage with the driving control signal to produce a first comparison result signal;
   an error signal generating circuit for generating a lag direction signal or a lead direction signal based on the first comparison result signal and the zero-current detected signal;
   a voltage level error signal generating circuit for generating a voltage level error signal in response to the lag direction signal or the lead direction signal;
   a timer for producing a timer signal having a predetermined sawtooth waveform; and
   a second comparator for comparing the voltage level error signal with the timer signal to produce a second comparison result signal as the delay correction signal.

5. The switching power supply as claimed in claim 1, wherein said control circuit further comprises:
   a control logic circuit for producing, in response to the delay correction signal, an original control signal for making said energizing switch turn off; and
   a driver for supplying, in response to the original control signal, the driving control signal to a control terminal of said energizing switch.

6. A switching power supply comprising:
   a switching power portion including a switching element and a control circuit for controlling turning-on/off of said switching element,
   wherein said switching power portion comprises a synchronous current resonance type DC/DC converting portion, and said synchronous current resonance type DC/DC converting portion comprises: (i) a resonance circuit that includes a resonance inductor and a resonance capacitor, (ii) a short-circuit switch, as said switching element, for short-circuiting said resonance capacitor, and (iii) a voltage detection arrangement for detecting a both-ends voltage of said resonance capacitor to produce a voltage detected signal,
   wherein said control circuit comprises a zero-voltage detection circuit for detecting a zero-voltage detected signal indicative of the zero-voltage, and said control circuit comprises a delay correction circuit for correcting a delay involved for driving said short-circuit switch,
   wherein said delay correction circuit produces a delay correction signal based on the zero-voltage detected signal and a driving control signal for turning said short circuit switch on/off, and said delay correction circuit produces the delay correction signal so that a timing for turning on said short-circuit switch by the driving control signal substantially coincides with an output timing of the zero-voltage detected signal.

7. The switching power supply as claimed in claim 6, wherein said control circuit further comprises:
   a control logic circuit for producing, in response to the delay correction signal, an original control signal for making said short-circuit switch turn on; and
   a driver for supplying, in response to the original control signal, the driving control signal to a control terminal of said short-circuit switch.

8. A method of controlling a switching timing of a switching element by a control circuit for use in a switching power supply comprising a switching power portion including said switching element and said control circuit for controlling turning-on/off of said switching element, wherein said switching power portion comprises a current resonance type DC/DC converting portion, and said current resonance type DC/DC converting portion comprises (i) a resonance circuit that includes a resonance inductor and a resonance capacitor, (ii) and energizing switch, as said switching element, for energizing said resonance inductor, and (iii) a current detection arrangement for detecting a current flowing through said energizing switch to produce a current detected signal, and wherein said control circuit comprises a zero-current detection circuit for detecting a zero-current based on the current detected signal to produce a zero-current detected signal indicative of the zero-current, said method comprising:
   correcting a delay involved in driving said energizing switch, by producing a delay correction signal based on the zero-current detected signal and a driving control signal for turning said energizing switch on/off,
   wherein said delay correction signal is produced so that a timing for turning off said energizing switch by the driving control signal substantially coincides with an output timing of the zero-current detected signal.

9. The method as claimed in claim 8, wherein said current resonance type DC/DC converting portion comprises a full-wave current resonance type DC/DC converting portion.

10. The method as claimed in claim 9, wherein said full-wave current resonance type DC/DC converting portion comprises a step-down full-wave current resonance type DC/DC converting portion.

11. The method as claimed in claim 8, wherein said delay correction comprises
  generating a reference voltage;
  comparing the reference voltage with the driving control signal to produce a first comparison result signal;
  generating a lag direction signal or a lead direction signal based on the first comparison result signal and the zero-current detected signal;
  generating a voltage level error signal in response to the lag direction signal or the lead direction signal;
  producing a timer signal having a predetermined sawtooth waveform; and
  comparing the voltage level error signal with the timer signal to produce a second comparison result signal as the delay correction signal.

12. The method as claimed in claim 8, further comprising:
  producing, in response to the delay correction signal, an original control signal for making said energizing switch turn off; and
  supplying, in response to the original control signal, the driving control signal to a control terminal of said energizing switch.

13. A method of controlling a switching timing of a switching element by a control circuit for use in a switching power supply comprising a switching power portion including said switching element and said control circuit for controlling turning-on/off of said switching element, wherein said switching power portion comprises a synchronous current resonance type DC/DC converting portion, and said synchronous current resonance type DC/DC converting portion comprises: (i) a resonance circuit that includes a resonance inductor and a resonance capacitor, (ii) a short-circuit switch, as said switching element, for short-circuiting said resonance capacitor, and (iii) a voltage detection arrangement for detecting a both-ends voltage of said resonance capacitor to produce a voltage detected signal, and wherein said control circuit comprises a zero-voltage detection circuit for detecting a zero-voltage based on the voltage detected signal to produce a zero-voltage detected signal indicative of the zero-voltage, said method comprising:
  correcting a delay involved in driving said short-circuit switch, by producing a delay correction signal based on the zero-voltage detected signal and a driving control signal for turning said short-circuit switch on/off,
  wherein said delay correction signal is produced so that a timing for turning on said short-circuit switch by the driving control signal substantially coincides with an output timing of the zero-voltage detected signal.

14. The method as claimed in claim 13, further comprising:
  producing, in response to the delay correction signal, an original control signal for making said short-circuit switch turn on; and
  supplying, in response to the original control signal, the driving control signal to a control terminal of said short-circuit switch.

* * * * *